US012194668B2

(12) United States Patent
Lu et al.

(10) Patent No.: US 12,194,668 B2
(45) Date of Patent: Jan. 14, 2025

(54) RAPID SHAPING AND ASEPTICALLY FILLING DEVICE FOR LIQUID CONTAINER

(71) Applicant: ASEPTIC INNOVATIVE MEDICINE CO., LTD., Taipei (TW)

(72) Inventors: Chin-Kun Lu, Taipei (TW); Shih-Chi Huang, Taipei (TW)

(73) Assignee: ASEPTIC INNOVATIVE MEDICINE CO., LTD., Taipei (TW)

( * ) Notice: Subject to any disclaimer, the term of this patent is extended or adjusted under 35 U.S.C. 154(b) by 76 days.

(21) Appl. No.: 18/318,857

(22) Filed: May 17, 2023

(65) Prior Publication Data

US 2024/0025100 A1    Jan. 25, 2024

(30) Foreign Application Priority Data

Jul. 20, 2022  (TW) .................................. 111207800

(51) Int. Cl.
| | | |
|---|---|---|
| B29C 48/00 | (2019.01) |
| B29C 48/30 | (2019.01) |
| B29C 48/32 | (2019.01) |
| B65B 3/02 | (2006.01) |

(52) U.S. Cl.
CPC ........ B29C 48/0016 (2019.02); B29C 48/303 (2019.02); B29C 48/32 (2019.02); B65B 3/022 (2013.01)

(58) Field of Classification Search
CPC ... B29C 48/0016; B29C 48/303; B29C 48/32; B29C 48/09; B29C 48/2883; B29C 65/02; B29C 65/18; B29C 66/242; B65B 3/022

USPC ............. 156/60, 145, 146, 242, 243, 244.11, 156/244.13, 244.18, 244.19, 290, 292, 156/308.2, 308.4, 309.6, 324, 349, 383, 156/500, 501, 538, 539, 543, 549, 580, 156/581, 582, 583.1, 583.5
See application file for complete search history.

(56) References Cited

U.S. PATENT DOCUMENTS

| | | | | |
|---|---|---|---|---|
| 1,628,333 | A * | 5/1927 | Schaub ..................... | B65B 9/12 |
| | | | | 264/DIG. 37 |
| 3,161,525 | A * | 12/1964 | Hey ........................ | B65B 3/022 |
| | | | | 53/433 |
| 3,271,223 | A * | 9/1966 | Sudo ....................... | B29C 66/43 |
| | | | | 156/244.27 |
| 4,021,283 | A * | 5/1977 | Weikert ................ | B65B 55/103 |
| | | | | 156/244.14 |

(Continued)

*Primary Examiner* — Philip C Tucker
*Assistant Examiner* — Brian R Slawski
(74) *Attorney, Agent, or Firm* — Best & Flanagan LLP

(57) ABSTRACT

A rapid shaping and aseptically filling device has an extrusion mold head, two mold mechanisms, and at least one filling needle. The extrusion mold head has an annular outlet, a needle passing through hole, and a shaping area defined below the annular outlet. The annular outlet forms a plastic blank. The two mold mechanisms are respectively located in two sides of the shaping area. Each of the two mold mechanisms is annular and has multiple molds. The molds are capable of moving circularly and sequentially passing the shaping area to engage with each other and tightly clamp the plastic blank. The at least one filling needle is mounted in the needle passing through hole and is located in a center of the plastic blank. A bottom end of the at least one filling needle is located above top two of the molds which engage with each other.

2 Claims, 5 Drawing Sheets

(56) References Cited

U.S. PATENT DOCUMENTS

| | | | | |
|---|---|---|---|---|
| 4,270,965 | A | * | 6/1981 | Torterotot ............... B65B 55/04 |
| | | | | 156/244.26 |
| 5,454,208 | A | * | 10/1995 | Kawano ............... B29D 22/003 |
| | | | | 53/433 |
| 5,962,039 | A | * | 10/1999 | Katou ..................... B65B 3/022 |
| | | | | 264/525 |

* cited by examiner

RAPID SHAPING AND ASEPTICALLY FILLING DEVICE FOR LIQUID CONTAINER

BACKGROUND OF THE INVENTION

1. Field of the Invention

The present invention relates to a liquid container manufacturing device, especially to a rapid shaping and aseptically filling device that forms liquid containers efficiently and synchronously completes liquid filling during shaping.

2. Description of the Prior Arts

A liquid container is used to contain various liquids such as potions, health liquids, juices or sauces. A conventional liquid container is made by the following steps. First, plastic raw material is heated and melted and then extruded into a plastic blank resembling a stripe-shaped bag. Next, two molds located respectively on two sides of the plastic blank are moved toward each other to clamp and mold the plastic blank. After molding is completed, the two molds are detached and the semi-finished container with an opening is transferred to a filling device for liquid filling. In the final step, the opening of the semi-finished container filled with liquid is sealed, and the manufacture and filling process of the conventional liquid container is done.

However, the abovementioned manufacture and filling process of the conventional liquid container takes too many steps. Each step needs to be done separately and takes certain waiting time. Specifically, the two molds need to be moved back and forth to clamp and de-clamp the plastic blank, and one molding step can only be started after a previous one is completely done and the plastic blank is pulled down. Further, molding and filling are performed separately. These reasons lead to long production time and low efficiency of manufacture.

To overcome the shortcomings, the present invention provides a rapid shaping and aseptically filling device to mitigate or obviate the aforementioned problems.

SUMMARY OF THE INVENTION

The main objective of the present invention is to provide a rapid shaping and aseptically filling device that overlaps molding steps of batches of containers and continuously forms containers by molds moving circularly. Besides, the present invention synchronously completes aseptically liquid filling during molding, thereby greatly improving production efficiency.

The rapid shaping and aseptically filling device has a plastic feeding tank, a heating extrusion tube, an extrusion mold head, two mold mechanisms, a filling assembly, and a liquid tank. The plastic feeding tank is adapted to load a plastic raw material. The heating extrusion tube is connected to the plastic feeding tank. The plastic raw material is adapted to enter the heating extrusion tube via the plastic feeding tank. The heating extrusion tube is adapted to heat and melt the plastic raw material and to transport the plastic raw material that is melted. An extrusion mold head is connected to the heating extrusion tube and has a needle passing through hole and an annular outlet. The annular outlet is an annular gap. The needle passing through hole is formed through a top surface and a bottom surface of the extrusion mold head, is located in an inner side of the annular outlet, and is independent from the annular outlet. A shaping area is defined right below the annular outlet and the needle passing through hole. The heating extrusion tube is adapted to transport the plastic raw material that is melted into the extrusion mold head and is adapted to extrude the plastic raw material that is melted out of the annular outlet to form a plastic blank. The two mold mechanisms are located below the extrusion mold head and are respectively located in two sides of the shaping area. Each of the two mold mechanisms is annular and has multiple molds. The molds are capable of moving circularly and sequentially passing the shaping area. In the shaping area, each one of the molds of the mold mechanism engages with a respective one of the molds of the other mold mechanism and tightly clamps the plastic blank. The filling assembly is mounted on the extrusion mold head and has at least one filling needle. The at least one filling needle is mounted in the needle passing through hole of the extrusion mold head and is located in a center of the plastic blank. A bottom end of the at least one filling needle is located above the molds which engage with each other. The liquid tank is connected to the at least one filling needle. The liquid tank is adapted to contain a liquid material and is capable of transporting the liquid material into the at least one filling needle.

By configuring the two mold mechanisms respectively in two sides of the shaping area (which are two sides of the plastic blank), making each of the two mold mechanisms annular, and making the molds capable of moving circularly and sequentially passing the shaping area, the molds of the two mold mechanisms can engage with each other and tightly clamp the plastic blank in the shaping area during circular moving, and thus the present invention overlaps molding steps of batches of containers and continuously forms containers. Besides, by mounting the at least one filling needle in the needle passing through hole of the extrusion mold head and in the center of the plastic blank, and locating the bottom end of the at least one filling needle above top two of the molds which engage with each other, the liquid tank is allowed to aseptically fill liquid into the liquid container during molding of the liquid container. As a result, the present invention synchronously completes aseptically liquid filling during molding and overlaps molding steps of batches of containers to continuously form containers, thereby greatly improving production efficiency.

Further, the at least one filling needle is located in the center of the plastic blank and therefore the at least one filling needle is isolated from air outside. The molds mold the plastic blank into the liquid container at high temperature, which has a certain bactericidal effect. As a result, the present invention can fill in liquid aseptically.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
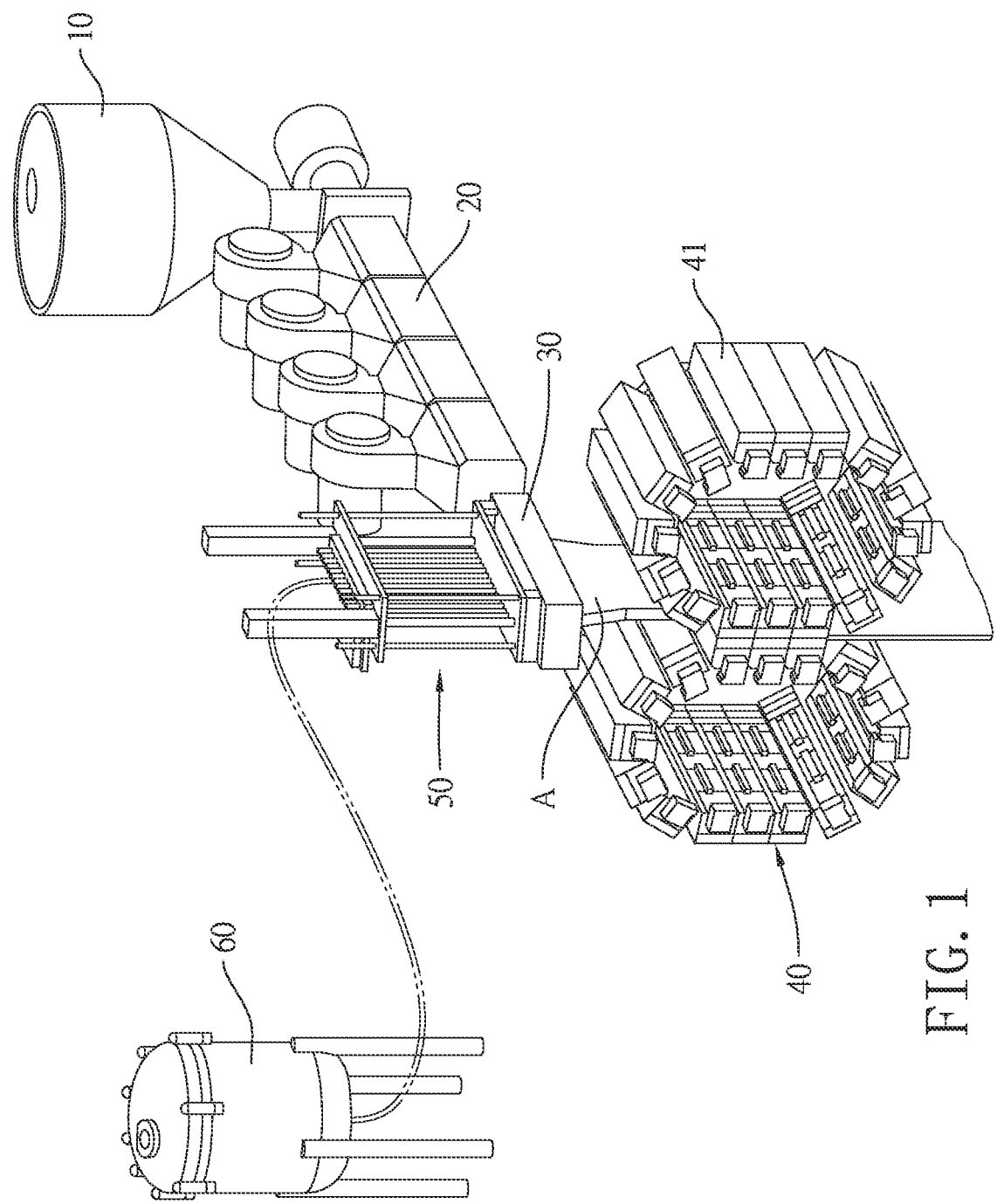
FIG. 1 is a perspective view of a rapid shaping and aseptically filling device in accordance with the present invention.
Figure 2:
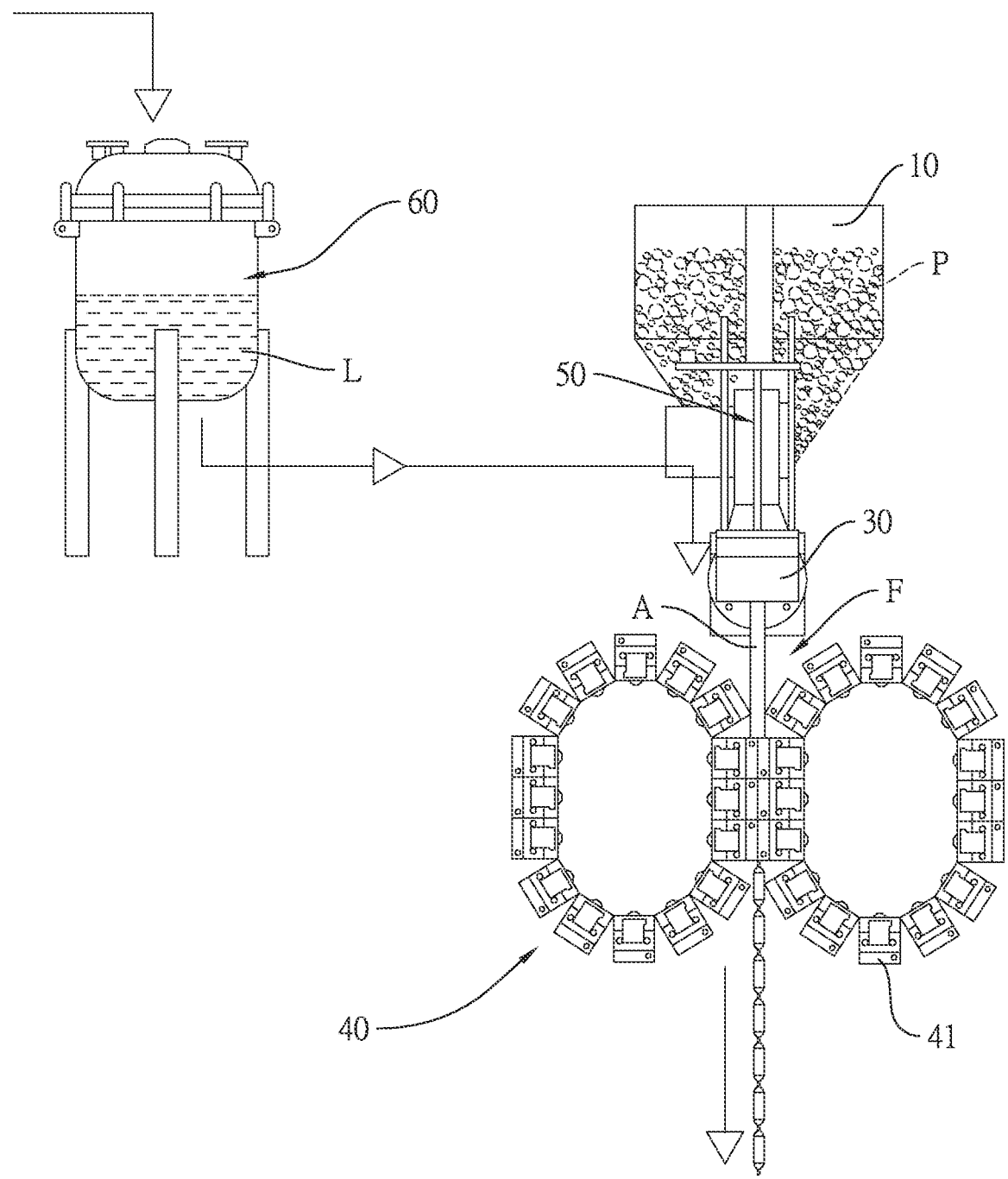
FIG. 2 is a front view of the rapid shaping and aseptically filling device in FIG. 1.

With reference to FIGS. 1 and 2, a rapid shaping and aseptically filling device in accordance with the present invention comprises a plastic feeding tank 10, a heating extrusion tube 20, an extrusion mold head 30, two mold mechanisms 40, a filling assembly 50, and a liquid tank 60.

The plastic feeding tank 10 is adapted to load a plastic raw material. The heating extrusion tube 20 is connected to the plastic feeding tank 10. The plastic raw material is adapted to enter the heating extrusion tube 20 via the plastic feeding tank 10. The heating extrusion tube 20 is adapted to heat and melt the plastic raw material and to transport the plastic raw material that is melted.

Figure 3:
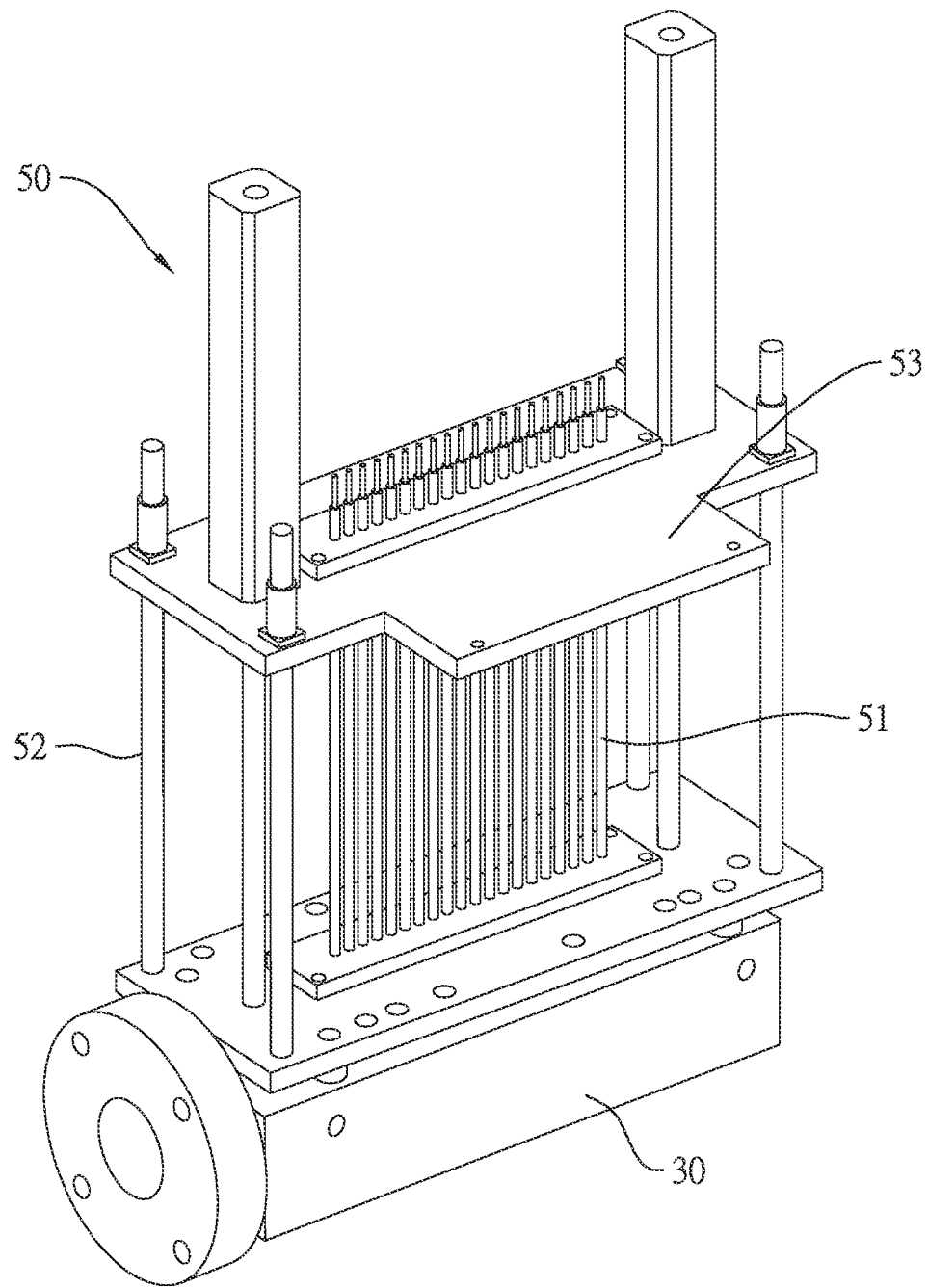
FIGS. 3 and 4 are operational views of the rapid shaping and aseptically filling device in FIG. 1, showing the filling assembly.

With reference to FIGS. 1, 2, and 3, the extrusion mold head 30 is connected to the heating extrusion tube 20 and has a needle passing through hole 31 and an annular outlet 32. The annular outlet 32 is an annular gap. The needle passing through hole 31 is formed through a top surface of the extrusion mold head 30 and a bottom surface of the extrusion mold head 30. The needle passing through hole 31 is located in an inner side of the annular outlet 32 and is independent from the annular outlet 32. A shaping area is defined right below the annular outlet 32 and the needle passing through hole 31. The heating extrusion tube 20 is adapted to transport the plastic raw material that is melted into the extrusion mold head 30 and is adapted to extrude the plastic raw material that is melted out of the annular outlet 32 to form a plastic blank A.

The two mold mechanisms 40 are located below the extrusion mold head 30 and are respectively located in two sides of the shaping area. Each of the two mold mechanisms 40 has an annular chain, a driving assembly, and multiple molds. The annular chain is annular. The driving assembly is connected to the annular chain and is capable of driving the annular chain to cycle. The molds are mounted on the annular chain and are moved by the cycling of the annular chain to sequentially pass the shaping area. In the shaping area, each one of the molds of one of the two mold mechanisms 40 engages with a respective one of the molds of the other of the two mold mechanisms 40 and tightly clamps the plastic blank A. In other words, the molds of one of the two mold mechanisms 40 that is passing the shaping area engage with the molds of the other of the two mold mechanisms 40 that is passing the shaping area to clamp the plastic blank A.

Figure 4:
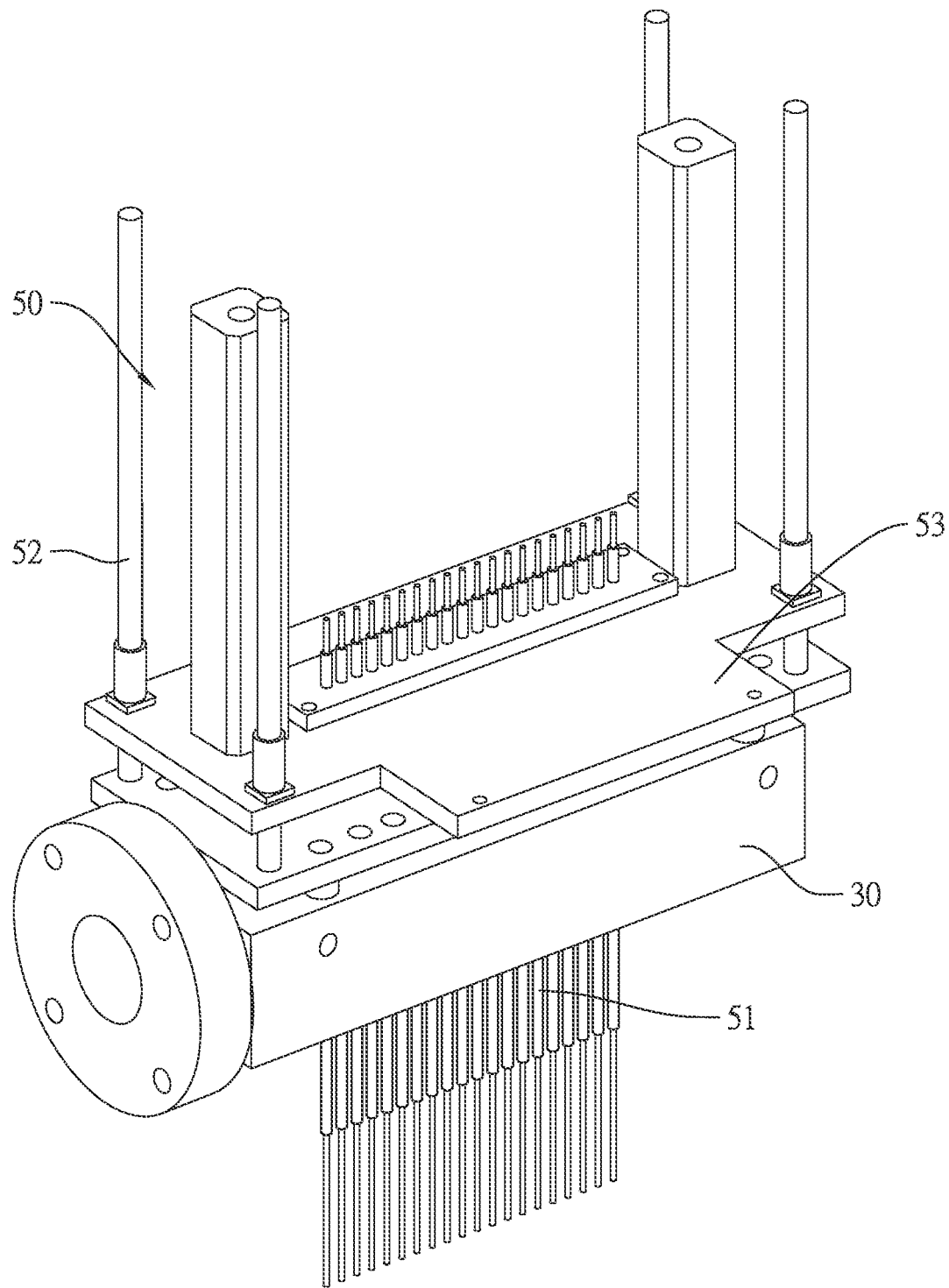
Figure 5:
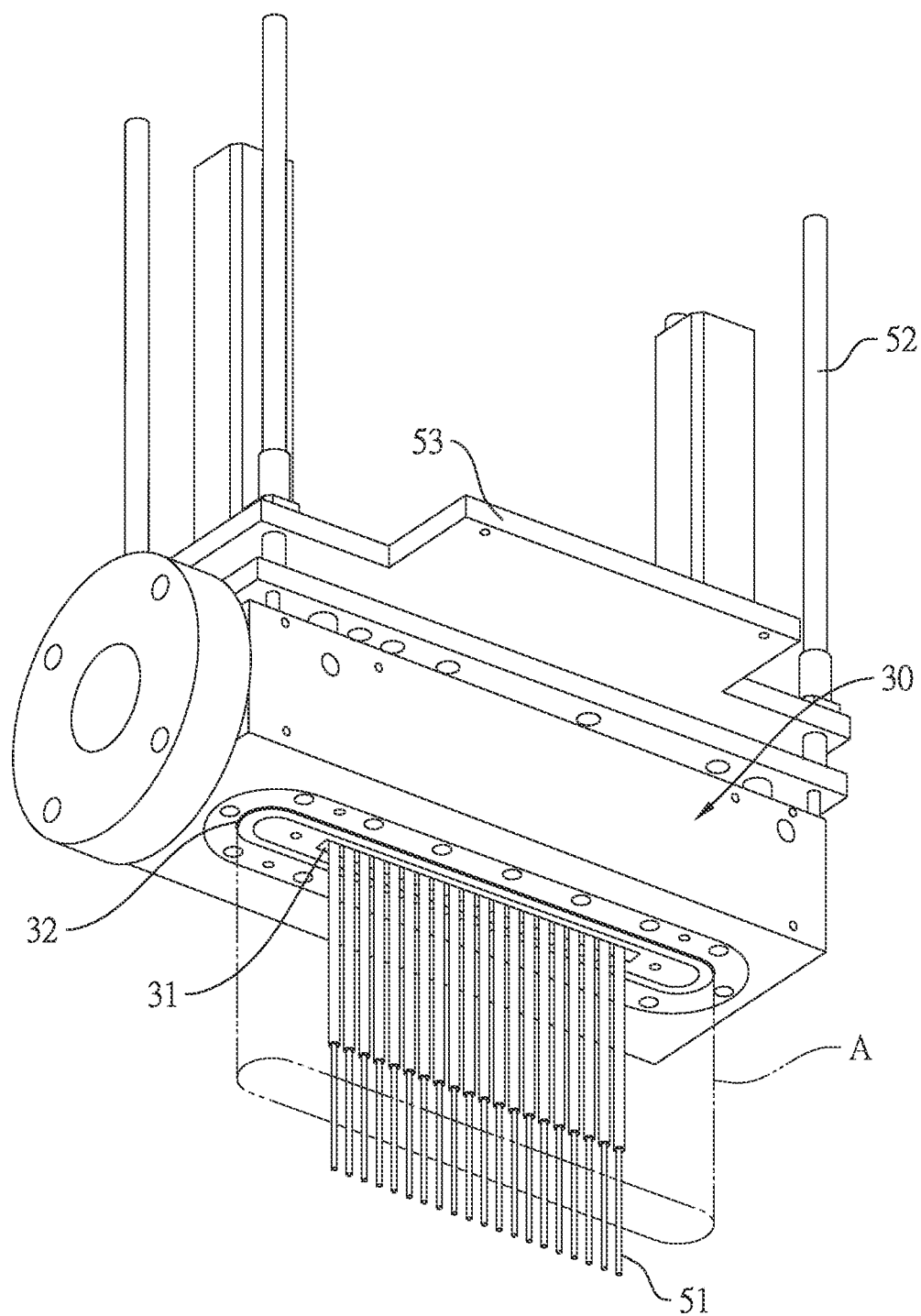
FIG. 5 is another perspective view of the rapid shaping and aseptically filling device in FIG. 1, showing the extrusion mold head, the at least one filling needle, and the plastic blank.

With reference to FIGS. 4, 5, and 10, the filling assembly 50 is mounted on the extrusion mold head 30 and has at least one filling needle 51, a sliding track 52, and a moving station 53. The at least one filling needle 51 is mounted in the needle passing through hole 31 of the extrusion mold head 30, is located in a center of the plastic blank A, and is located above the molds that engage with each other. The sliding track 52 is mounted on the extrusion mold head 30 and extends upwardly and downwardly. The moving station 53 is mounted on the sliding track 52 and moves along the sliding track 52. The at least one filling needle 51 is mounted on the moving station 53 and moves into or detaches from the needle passing through hole 31. The configuration of the sliding track 52 and the moving station 53 facilitates maintaining and adjusting an amount of the at least one filling needle 51. But in other embodiments, the at least one filling needle 51 can also be fixed.

The liquid tank 60 is connected to the at least one filling needle 51. The liquid tank 60 is adapted to load a liquid material and is capable of transporting the liquid material into the at least one filling needle 51.

The operation process of the present invention is as follows:

First, the plastic blank A is formed by the plastic feeding tank 10, the heating extrusion tube 20, and the extrusion mold head 30, and then the plastic blank A is moved downward into the shaping area. The two mold mechanisms 40 on the two sides of the shaping area cycle downward to pull down the plastic blank A and engage the plastic blank A between the two mold mechanisms 40. In the shaping area, each one of the molds of one of the mold mechanisms 40 engages with a respective one of the molds of the other mold mechanism 40 and tightly clamps the plastic blank A, and the plastic blank A forms a semi-finished container between the two molds engaging with each other.

During the shaping process, since the bottom end of the at least one filling needle 51 is located above the molds that engage with each other, the at least one filling needle 51 is capable of injecting and filling the liquid material into the semi-finished container aseptically. The two mold mechanisms 40 keep cycling downward during the filling operation, so next pair of the molds begins to engage during the aseptically filling process.

By configuring the two mold mechanisms 40 respectively in two sides of the shaping area (which are two sides of the plastic blank A), making each of the two mold mechanisms 40 being annular, and making the molds capable of moving circularly and sequentially passing the shaping area, the molds of the two mold mechanisms 40 can engage with each other and tightly clamp the plastic blank A in the shaping area during circular moving, and thus the present invention overlaps molding steps of batches of containers and continuously forms containers. Besides, by mounting the at least one filling needle 51 in the needle passing through hole 31 of the extrusion mold head 30 and in the center of the plastic blank A, and locating the bottom end of the at least one filling needle 51 above top two of the molds which engage with each other, the liquid tank 60 is allowed to aseptically fill liquid into the liquid container during molding of the liquid container. As a result, the present invention synchronously completes aseptically liquid filling during molding and overlaps molding steps of batches of containers to continuously form containers, thereby greatly improving production efficiency.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A rapid shaping and aseptically filling device comprising:
   a plastic feeding tank adapted to load a plastic raw material;
   a heating extrusion tube connected to the plastic feeding tank; the plastic raw material adapted to enter the heating extrusion tube via the plastic feeding tank; the heating extrusion tube adapted to heat and melt the plastic raw material and to transport the plastic raw material that is melted;
   an extrusion mold head connected to the heating extrusion tube and having a needle passing through hole and an annular outlet; the annular outlet being an annular gap; the needle passing through hole formed through a top surface and a bottom surface of the extrusion mold head, located in an inner side of the annular outlet, and being independent from the annular outlet; a shaping area defined right below the annular outlet and the needle passing through hole; the heating extrusion tube adapted to transport the plastic raw material that is melted into the extrusion mold head and extrude the plastic raw material that is melted out of the annular outlet to form a plastic blank;

two mold mechanisms located below the extrusion mold head and respectively located in two sides of the shaping area; each of the two mold mechanisms being annular and having
- multiple molds capable of moving circularly and sequentially passing the shaping area; in the shaping area, each one of the molds of the mold mechanism engaging with a respective one of the molds of the other mold mechanism and tightly clamping the plastic blank;

a filling assembly mounted on the extrusion mold head and having
- at least one filling needle mounted in the needle passing through hole of the extrusion mold head and located in a center of the plastic blank; a bottom end of the filling needle located above the molds which engage with each other;
- a liquid tank connected to the at least one filling needle; the liquid tank adapted to contain a liquid material and transport the liquid material into the at least one filling needle.

2. The rapid shaping and aseptically filling device as claimed in claim 1, wherein
the filling assembly has
- a sliding track mounted on the extrusion mold head and extending upward and downward; and
- a moving station mounted on the sliding track and being capable of moving along the sliding track; and the at least one filling needle is mounted on the moving station and is capable of moving into or detached from the needle passing through hole along with the move of the moving station.

* * * * *